US010184503B2

(12) United States Patent
Mori

(10) Patent No.: US 10,184,503 B2
(45) Date of Patent: Jan. 22, 2019

(54) FASTENING STRUCTURE

(71) Applicant: TOYOTA JIDOSHA KABUSHIKI KAISHA, Toyota-shi, Aichi-ken (JP)

(72) Inventor: Hiroyuki Mori, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 15/412,774

(22) Filed: Jan. 23, 2017

(65) Prior Publication Data
US 2017/0268547 A1 Sep. 21, 2017

(30) Foreign Application Priority Data

Mar. 18, 2016 (JP) .................................. 2016-055670
Sep. 28, 2016 (JP) .................................. 2016-190022

(51) Int. Cl.
*F16B 5/02* (2006.01)
*B62D 27/02* (2006.01)
*F16B 37/04* (2006.01)
*F16B 43/00* (2006.01)

(52) U.S. Cl.
CPC ................ *F16B 5/02* (2013.01); *B62D 27/02* (2013.01); *B62D 27/026* (2013.01); *F16B 37/04* (2013.01); *F16B 43/00* (2013.01); *F16B 43/001* (2013.01)

(58) Field of Classification Search
CPC .. F16B 5/02; F16B 5/0258; F16B 5/06; F16B 5/065; F16B 43/001; Y10T 403/75; Y10T 403/45; Y10T 403/451; Y10T 403/453; B62D 27/02; B62D 27/026; B62D 27/06; B62D 27/065
See application file for complete search history.

(56) References Cited

U.S. PATENT DOCUMENTS

| | | | | |
|---|---|---|---|---|
| 2,748,906 A * | 6/1956 | Flora | ....................... | F16B 2/241 403/256 |
| 4,050,771 A * | 9/1977 | Watson | .................... | H01R 9/18 403/408.1 |
| 4,437,784 A * | 3/1984 | Peterson | ............. | E04F 13/0853 29/432.2 |
| 6,938,385 B2 * | 9/2005 | Lind | ................. | B32B 17/10293 411/107 |
| 7,086,688 B2 * | 8/2006 | Edwards | .............. | B62D 25/087 296/181.3 |
| 9,511,544 B2 * | 12/2016 | Hemingway | ............ | H02G 3/32 |

(Continued)

FOREIGN PATENT DOCUMENTS

JP 2007332983 A 12/2007
JP 2009-204159 A 9/2009

(Continued)

*Primary Examiner* — Jonathan P Masinick
(74) *Attorney, Agent, or Firm* — Oliff PLC

(57) ABSTRACT

A fastening structure that includes: a nut fabricated of metal that is screwed onto the threaded portion; a collar including a collar main body fabricated of metal that includes: a tubular portion through which the threaded portion penetrates, and a flange that is formed at an outer periphery portion of the tubular portion and that is disposed at the other plate thickness direction side of the resin member, the collar main body touching against the washer main body and the nut; and a base portion fabricated of resin that structures a portion of the collar and that is disposed between the flange and the resin member.

8 Claims, 9 Drawing Sheets

(56) References Cited

U.S. PATENT DOCUMENTS

| 9,746,021 B2* | 8/2017 | Kawashima | F16B 43/001 |
| 2005/0201846 A1* | 9/2005 | Santamaria | B62D 25/163 |
| | | | 411/108 |
| 2011/0033260 A1* | 2/2011 | Miura | B23K 9/201 |
| | | | 411/81 |
| 2012/0003034 A1 | 1/2012 | Inaba et al. | |
| 2016/0102688 A1* | 4/2016 | Buesing | F16B 1/0071 |
| | | | 403/27 |
| 2017/0008558 A1* | 1/2017 | Kruger | B60G 7/005 |

FOREIGN PATENT DOCUMENTS

| JP | 2010-255813 A | 11/2010 |
| JP | 2015-086942 A | 5/2015 |
| WO | 2015/064182 A1 | 5/2015 |

* cited by examiner

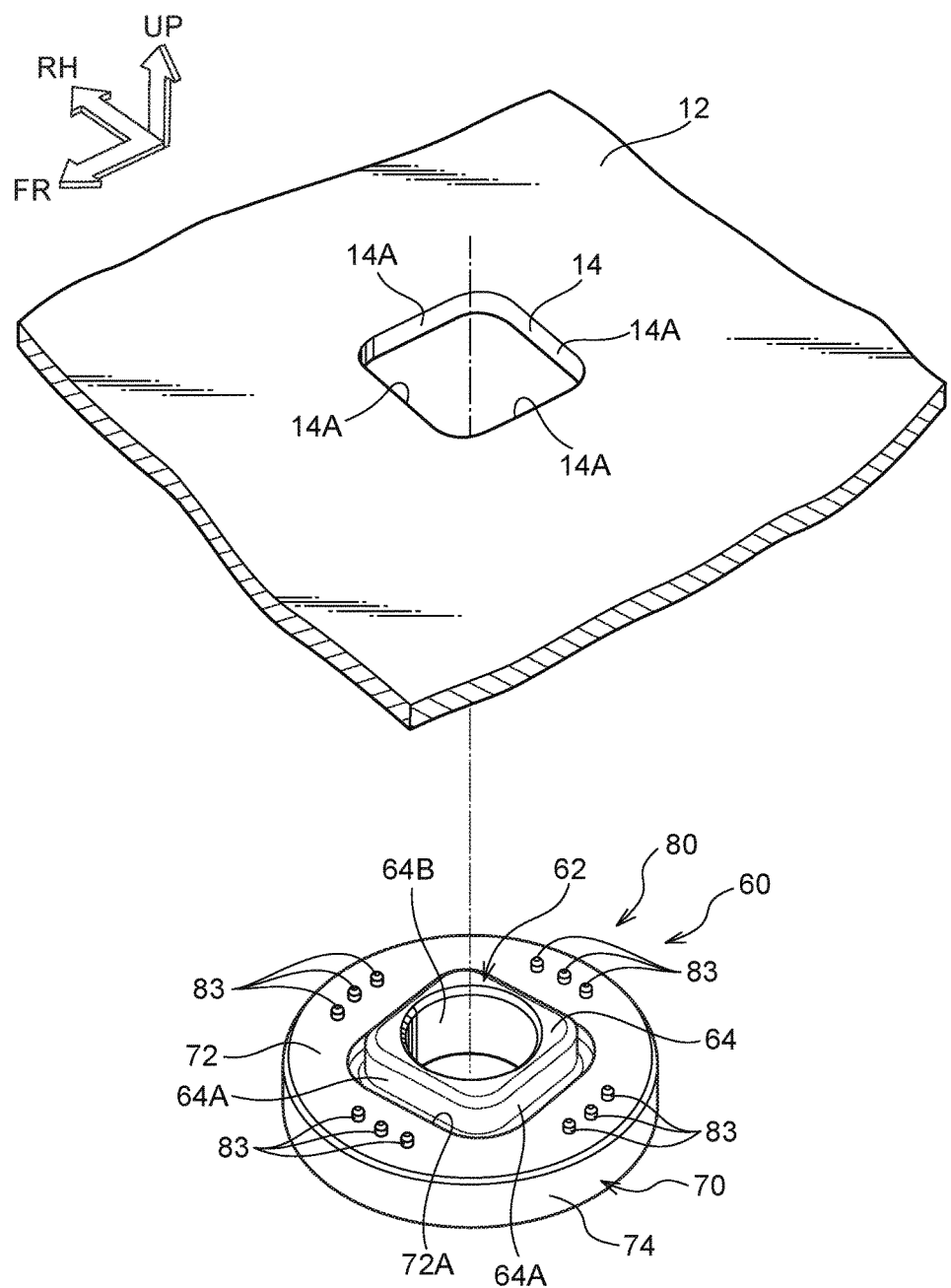

FASTENING STRUCTURE

CROSS-REFERENCE TO RELATED APPLICATION

This application is based on and claims priority under 35 USC 119 from Japanese Patent Application No. 2016-055670 filed on Mar. 18, 2016 and Japanese Patent Application No. 2016-190022 filed on Sep. 28, 2016, which are incorporated by reference herein.

BACKGROUND

Technical Field

The present disclosure relates to a fastening structure.

Related Art

Japanese Patent Application Laid-Open (JP-A) No. 2010-255813 discloses a fastening structure that fastens a sunshade housing, which is a metal member, to a roof panel, which is a resin member. More specifically, in a state in which a mounting portion of the sunshade housing and a joining portion of the resin roof panel are fastened together by a fastening bolt and a nut, a plate spring is interposed between the mounting portion and the joining portion. Thus, a structure is formed in which the resin roof panel is displaceable within a predetermined range in an axial direction of the fastening bolt.

In the fastening structure described above, if the sunshade housing that is a metal member is replaced with a resin member, there is a risk of creep occurring in the resin member, because of the resin member being nipped by a washer of the fastening bolt and the nut.

SUMMARY

In consideration of the circumstances described above, an object of the present disclosure is to provide a fastening structure that may suppress the occurrence of creep in a resin member.

A fastening structure according to an aspect includes: an annular washer that is disposed adjacent to a plate-shaped resin member at one plate thickness direction side of the resin member and that includes a washer main body fabricated of metal; a bolt fabricated of metal, including a head portion that is disposed at the opposite side of the washer from the side thereof at which the resin member is disposed and that, together with the washer, sandwiches a fastened member, and a threaded portion that projects from the head portion to the other plate thickness direction side of the resin member and that penetrates through the inside of the washer and the inside of a penetrating hole formed in the resin member; a nut fabricated of metal that is screwed onto the threaded portion; a collar including a collar main body fabricated of metal that includes a tubular portion through which the threaded portion penetrates, and a flange that is formed at an outer periphery portion of the tubular portion and that is disposed at the other plate thickness direction side of the resin member, the collar main body touching against the washer main body and the nut; and a base portion fabricated of resin that structures a portion of the collar and that is disposed between the flange and the resin member.

BRIEF DESCRIPTION OF DRAWINGS

FIG. 7 is a disassembled perspective view of a fastening structure of a second exemplary embodiment in which a collar is seen from the vehicle upper side, in which the collar is disassembled from an outer panel.

DESCRIPTION OF EMBODIMENTS

First Exemplary Embodiment

Figure 1:
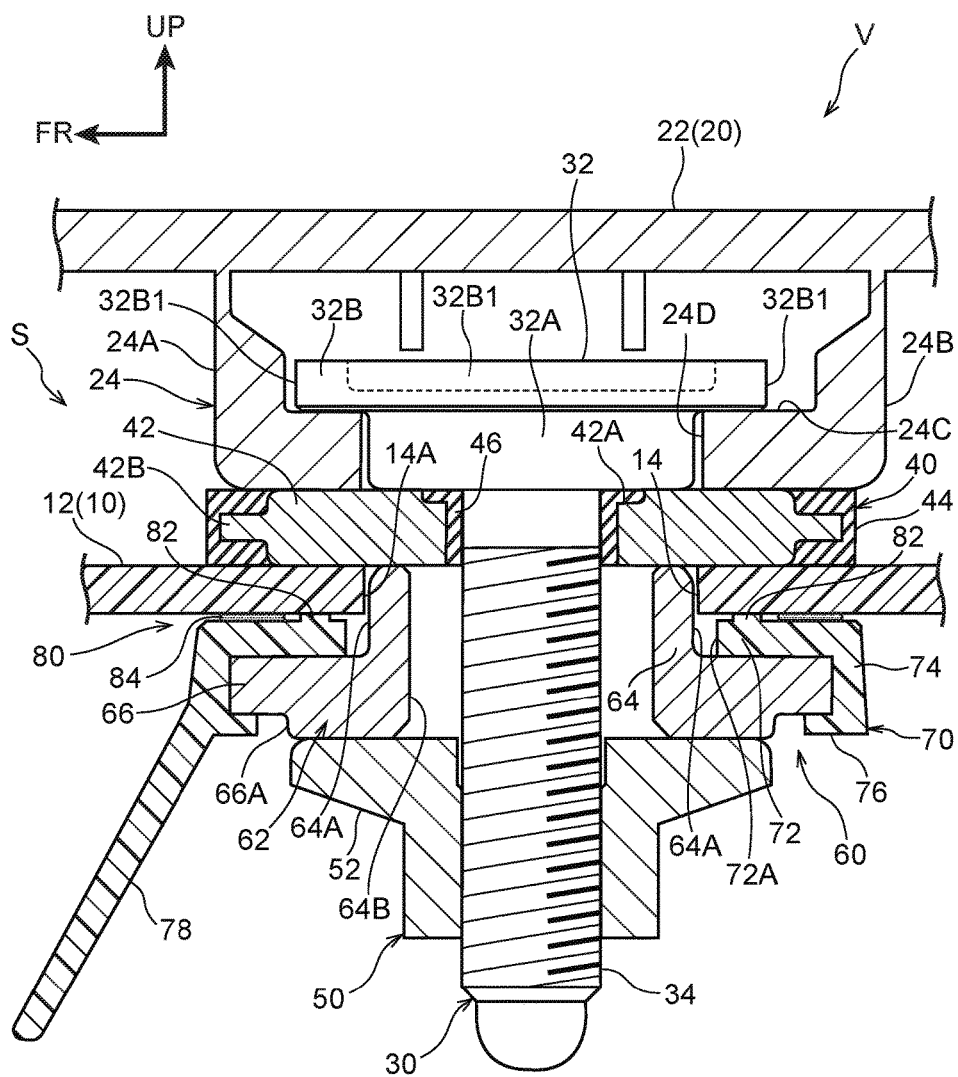
FIG. 1 is a sectional diagram in which a fastening structure of a first exemplary embodiment is seen from a vehicle left side.

Herebelow, a fastening structure S according to a first exemplary embodiment is described using FIG. 1 to FIG. 6. The fastening structure S according to the present exemplary embodiment is employed at a fastening region at which a member of a vehicle V (an automobile) is fastened to a vehicle body resin member fabricated of resin that structures the vehicle body of the vehicle V. Hereinafter, the vehicle front side of the vehicle V in which the fastening structure S is employed is indicated in the drawings by arrow FR, the vehicle upper side is indicated by arrow UP, and the vehicle right side is indicated by arrow RH. Where descriptions are given below simply using the directions front, rear, up, down, left and right, these generally represent the front and rear in the vehicle front-and-rear direction, up and down in the vehicle vertical direction, and left and right in the vehicle left-and-right direction (vehicle width direction).

Figure 2:
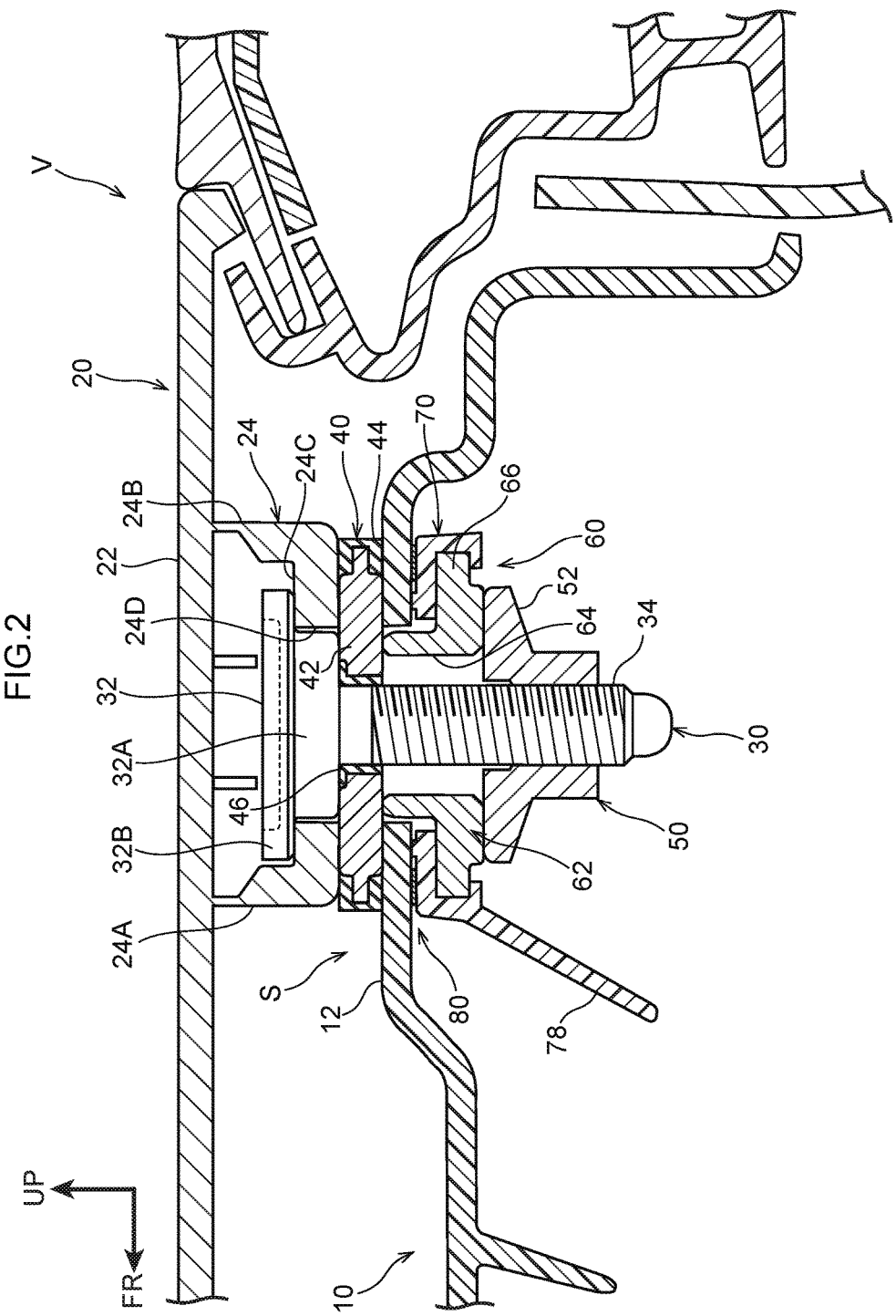
FIG. 2 is a sectional diagram in which a portion of a rear portion of the vehicle in which the fastening structure of the first exemplary embodiment is employed is seen from the vehicle left side.

As shown in FIG. 2, in the present exemplary embodiment the fastening structure S is employed at, as an example, a region at which a rear spoiler 20, serving as a "fastened member", is fastened to a back door 10 fabricated of resin that structures a rear portion of the vehicle V. Firstly below, structures around the fastening portion of the back door 10 and the rear spoiler 20 are described, after which the fastening structure S is described.

Figure 4:
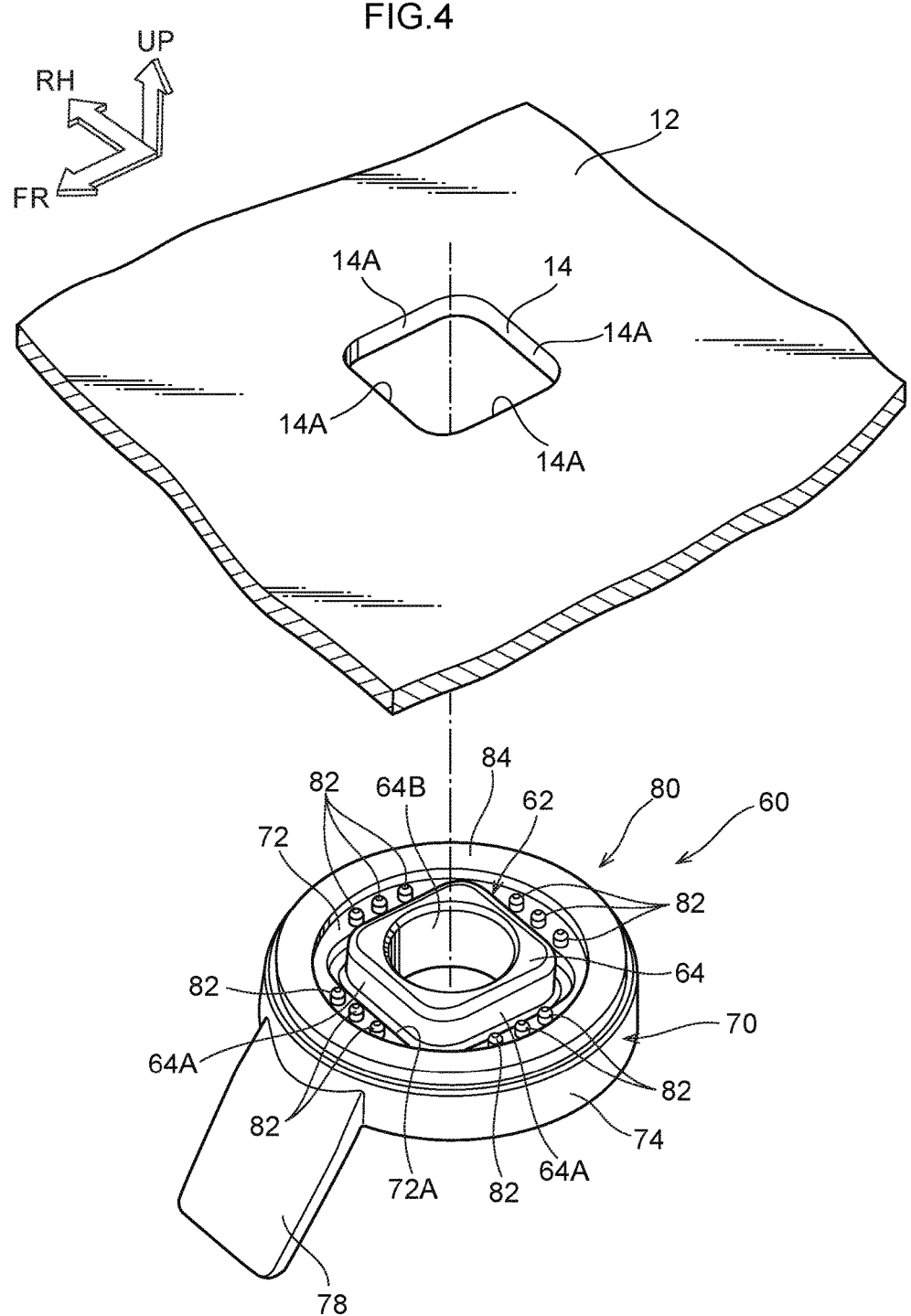
FIG. 4 is a disassembled perspective view in which a collar is seen from the vehicle upper side, in which the collar is disassembled from an outer panel shown in FIG. 1.

The back door 10 includes an outer panel 12, serving as a "resin member", to which the rear spoiler 20 is fastened. The outer panel 12 is fabricated of resin and is formed in a plate shape whose plate thickness direction is substantially in the vertical direction. As shown in FIG. 4, a penetrating hole 14 is formed penetrating through the outer panel 12. The penetrating hole 14 is for fastening of the rear spoiler 20 by the fastening structure S that is described below, and is formed in a substantially rectangular shape. The inner periphery portion of the penetrating hole 14 is constituted by four planar side faces. These side faces serve as engaging faces 14A (elements which may be broadly understood as serving as an "engaging portion").

As shown in FIG. 2, the rear spoiler 20 is disposed at the upper side of the outer panel 12. The rear spoiler 20 includes an upper wall 22 that structures an outer periphery face of the rear spoiler 20. The upper wall 22 is disposed at the upper side of the penetrating hole 14 with a plate thickness direction of the upper wall 22 substantially in the vertical direction. A mounting portion 24 is integrally formed at a location of the upper wall 22 that is to be at the upper side of the penetrating hole 14. The mounting portion 24 is for mounting the rear spoiler 20 to the outer panel 12. In a side sectional view of the vehicle V, the mounting portion 24 is formed in a substantial "U" shape that opens to the upper side. More specifically, the mounting portion 24 includes a pair of side walls 24A and 24B and a floor wall 24C that connects between lower end portions of the side walls 24A and 24B. Plate thickness directions of the side walls 24A and 24B are in the front-and-rear direction, and a plate thickness direction of the floor wall 24C is in the vertical direction. Upper end portions of the side walls 24A and 24B are joined to the upper wall 22. Plate thicknesses of upper end portions of the side walls 24A and 24B are specified to be thicker than plate thicknesses of other portions of the upper wall 22. A mounting slot 24D is formed in the floor wall 24C. The mounting slot 24D penetrates through the floor wall 24C in the vertical direction, extends in the vehicle width direction of the vehicle V, and opens out to one side of the vehicle width direction.

—The Fastening Structure S—

As shown in FIG. 1, the fastening structure S is structured with a bolt 30, a washer 40, a nut 50 and a collar 60. These structures are described below.

—The Bolt 30—

Figure 3:
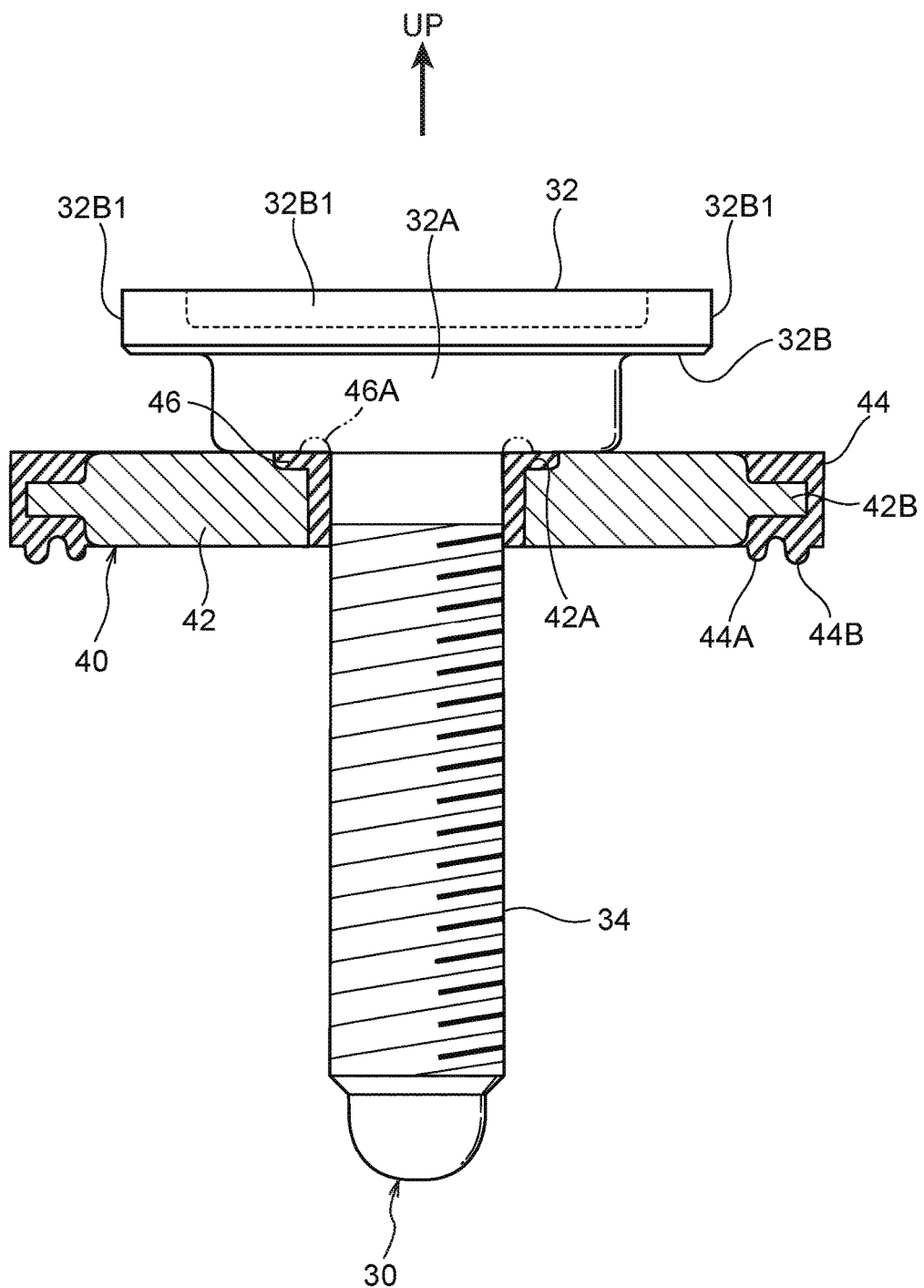
FIG. 3 is a vertical sectional diagram of an assembled state of a bolt and washer shown in FIG. 1, in a partially cutaway state.

As shown in FIG. 3, the bolt 30 is fabricated of metal and is disposed with an axial direction thereof in the vertical direction. The bolt 30 includes a head portion 32, which structures one axial direction end portion (an upper end portion) of the bolt 30, and a threaded portion 34, which extends from the head portion 32 to the other axial direction end side (the lower side) of the bolt 30. The bolt 30 is structured as a step bolt. That is, the head portion 32 of the bolt 30 includes a head portion main body 32A formed in a substantially circular column shape, and a flanged portion 32B that projects to diametric direction outer sides from the head portion 32 at one axial direction end portion of the head portion 32. A male thread is formed at outer periphery portions of the threaded portion 34.

Viewed in the axial direction of the bolt 30, the flanged portion 32B is formed in a rectangular shape (specifically a square shape). That is, an outer periphery face of the flanged portion 32B is constituted by four planar side faces 32B1. As shown in FIG. 1, the head portion main body 32A is inserted into the mounting slot 24D of the rear spoiler 20 and the flanged portion 32B is disposed at the rear spoiler 20 adjacent to the upper side of the floor wall 24C of the mounting portion 24. The threaded portion 34 penetrates through the interior of the penetrating hole 14 of the outer panel 12. One of the side faces 32B1 of the flanged portion 32B is disposed close to the rear side of the side wall 24A that is at the front side of the mounting portion 24. Thus, this side face 32B1 and the rear face of the side wall 24A are disposed to oppose one another in the front-and-rear direction.

—Washer 40—

As shown in FIG. 1, the washer 40 is formed in a substantially circular annular plate shape and is disposed between the head portion main body 32A of the bolt 30 and the outer panel 12 of the back door 10 with a plate thickness direction of the washer 40 in the vertical direction. That is, the washer 40 is disposed adjacent to the upper side of the outer panel 12. The washer 40 includes a washer main body 42, an outer side rubber portion 44 and an inner side rubber portion 46. The outer side rubber portion 44 structures a diametric direction outer side region of the washer 40 and serves as an "outer side resilient portion". The inner side rubber portion 46 structures a diametric direction inner side region of the washer 40 and serves as an "inner side resilient portion".

The washer main body 42 is fabricated of metal and is formed in a substantially circular annular plate shape. A step portion 42A is formed at an inner periphery side edge portion of an upper face (a face at the one plate thickness direction side) of the washer main body 42. The step portion 42A is open toward the diametric direction inner side and the upper side of the washer main body 42, and is formed over the whole circumference in the circumferential direction of the washer main body 42. A flange portion 42B is formed at a plate thickness direction middle portion of an outer periphery face of the washer main body 42. The flange portion 42B projects from the washer main body 42 to diametric direction outer sides and is formed over the whole circumference in the circumferential direction of the washer main body 42.

The outer side rubber portion 44 is constituted of a resilient material (in the present exemplary embodiment, a rubber material). The outer side rubber portion 44 is formed in a substantial ring shape and is formed integrally with the outer periphery portion of the washer main body 42. More specifically, in a vertical sectional view, the outer side rubber portion 44 is formed in a substantial "U" shape that opens toward the diametric direction inner side of the washer main body 42. The outer side rubber portion 44 is formed integrally with the washer main body 42 so as to cover the flange portion 42B of the washer main body 42, and extends over the whole circumference in the circumferential direction of the washer main body 42. An upper face of the outer side rubber portion 44 is disposed to be coplanar with the upper face of the washer main body 42, and a lower face of the outer side rubber portion 44 is disposed to be coplanar with a lower face of the washer main body 42.

As shown in FIG. 3, a pair of outer side ribs 44A and 44B are formed integrally with the lower face of the outer side rubber portion 44, protruding to the lower side. The outer side ribs 44A and 44B serve as an "outer side protrusion portion". The pair of outer side ribs 44A and 44B are formed in ring shapes and are arranged next to one another in the diametric direction of the washer 40. That is, viewed from the lower side, the pair of outer side ribs 44A and 44B are formed in concentric circular shapes. In a vertical sectional view, distal end portions (lower end portions) of the outer side rubber portion 44 are formed in substantially semicircular shapes. In a fastened state of the fastening structure S, the outer side ribs 44A and 44B are pressed by the outer panel 12 so as to be compressively deformed in the vertical direction.

The inner side rubber portion 46 is constituted of a resilient material (in the present exemplary embodiment, a rubber material). The inner side rubber portion 46 is formed in a substantial ring shape and is formed integrally with the inner periphery portion of the washer main body 42. More specifically, in a vertical sectional view, the inner side rubber portion 46 is formed in a substantial inverted "L" shape so as to cover the inner periphery face and the step portion 42A of the washer main body 42. The inner side rubber portion 46 extends over the whole circumference in the circumferential direction of the washer main body 42 and is formed integrally with the washer main body 42. An upper face of the inner side rubber portion 46 is disposed to be coplanar with the upper face of the washer main body 42, and a lower face of the inner side rubber portion 46 is disposed to be coplanar with the lower face of the washer main body 42.

An inner diameter of the inner side rubber portion 46 is specified to be slightly smaller than an outer diameter of the bolt 30 at a proximal end portion of the threaded portion 34. The threaded portion 34 is inserted (pushed) through the interior of the inner side rubber portion 46. Thus, the threaded portion 34 is retained by the inner side rubber portion 46 and the bolt 30 and washer 40 are put into an assembled state.

An inner side rib 46A (see the inner side rib 46A depicted by two-dot chain lines in FIG. 3) is formed integrally with the upper face of the inner side rubber portion 46, protruding to the upper side in a ring shape. The inner side rib 46A serves as an "inner side protrusion portion". In a vertical sectional view, a distal end portion (upper end portion) of the inner side rib 46A is formed in a substantially semicircular shape. When the washer 40 is fastened to the outer panel 12 of the back door 10, the inner side rib 46A is pressed by the head portion main body 32A of the bolt 30 so as to be compressively deformed in the vertical direction.

—The Nut 50—

As shown in FIG. 1, the nut 50 is fabricated of metal. The nut 50 is formed in a tubular shape, and a female thread is formed at inner periphery portions of the nut 50. A flange portion 52 is formed integrally at one axial direction end portion of the nut 50. The flange portion 52 projects to diametric direction outer sides of the nut 50. One axial direction face of the nut 50 serves as a seat face. The nut 50 is screwed onto the threaded portion 34 of the bolt 30 from the lower side thereof. In the state in which the nut 50 has been screwed onto the threaded portion 34, a structure is formed in which the below-described collar 60 is sandwiched by the nut 50 and the washer main body 42 of the washer 40.

—Collar 60—

The collar 60 is disposed between the washer 40 and the nut 50, and is structured to be sandwiched by the washer 40 and the nut 50. The collar 60 includes a collar main body 62 fabricated of metal and a molded portion 70 fabricated of resin. The collar 60 also includes a gap regulation portion 80. In this structure, looseness of the collar 60 with respect to the outer panel 12 is reduced by the gap regulation portion 80 and the collar 60 is retained at the outer panel 12 by the gap regulation portion 80. Below, structure of the collar 60 is described.

The collar main body 62 includes a tubular portion 64 in a tubular shape whose axial direction is in the vertical direction. Viewed in the axial direction of the tubular portion 64, an exterior shape of the tubular portion 64 is formed in a substantially rectangular shape (specifically a square shape) that is similar in shape to the penetrating hole 14 of the outer panel 12 (see FIG. 4). Thus, the outer periphery face of the tubular portion 64 is constituted by four planar side faces. These side faces serve as engaged faces 64A (elements which may be broadly understood as serving as an "engaged portion"). The size of an outer periphery portion of the tubular portion 64 is specified to be slightly smaller than the size of the penetrating hole 14 of the outer panel 12. An upper end portion of the tubular portion 64 is inserted into the penetrating hole 14. Thus, a structure is formed in which, if the collar 60 acts to turn about the tubular portion 64, the engaged faces 64A of the tubular portion 64 engage with the engaging faces 14A of the penetrating hole 14 disposed at the outer sides of the engaged faces 64A and restrict the turning of the collar 60.

A penetrating hole 64B with a circular shape in cross section penetrates through the inner periphery portion of the tubular portion 64 in the vertical direction. The penetrating hole 64B is disposed to be substantially coaxial with the threaded portion 34 of the bolt 30, and the threaded portion 34 is inserted through the interior of the penetrating hole 64B.

The collar main body 62 includes a collar flange 66 formed at an outer periphery portion of the tubular portion 64. The collar flange 66 serves as a "flange". The collar flange 66 projects from a lower end portion of the tubular portion 64, extends over the whole circumference in the circumferential direction of the tubular portion 64, and is to be disposed at the lower side of the outer panel 12. Viewed in the axial direction of the tubular portion 64, an exterior shape of the collar flange 66 is formed in a circular shape, but this is not shown in the drawings. A lower face of the collar flange 66 and the lower face of the tubular portion 64 are disposed to be coplanar and structure a lower face of the collar main body 62. An incision portion 66A is formed in an outer periphery portion of the lower face of the collar flange 66. The incision portion 66A opens to the lower side and the diametric direction outer side of the collar flange 66.

In the fastened state of the fastening structure S, an upper face of the collar main body 62 (the tubular portion 64) is in area contact with the lower face of the washer main body 42 of the washer 40, and the lower face of the collar main body 62 is in area contact with the seat face (the upper face) of the nut 50.

The molded portion 70 is formed integrally with the collar main body 62 so as to cover the collar flange 66. More specifically, as shown in FIG. 4, the molded portion 70 includes a base portion 72 in a substantially circular plate shape that is formed integrally with the upper face of the collar flange 66. The base portion 72 is disposed between the collar flange 66 and the outer panel 12. A disposition hole 72A, for disposition of the tubular portion 64 of the collar main body 62, is formed penetrating through the base portion 72 in the vertical direction. The disposition hole 72A is formed in a rectangular shape that is a similar shape to the exterior shape of the tubular portion 64. An upper face of the base portion 72 is arranged along a plane orthogonal to the axial direction of the tubular portion 64 and is disposed so as to oppose the lower face of the outer panel 12 in the vertical direction.

Figure 5:
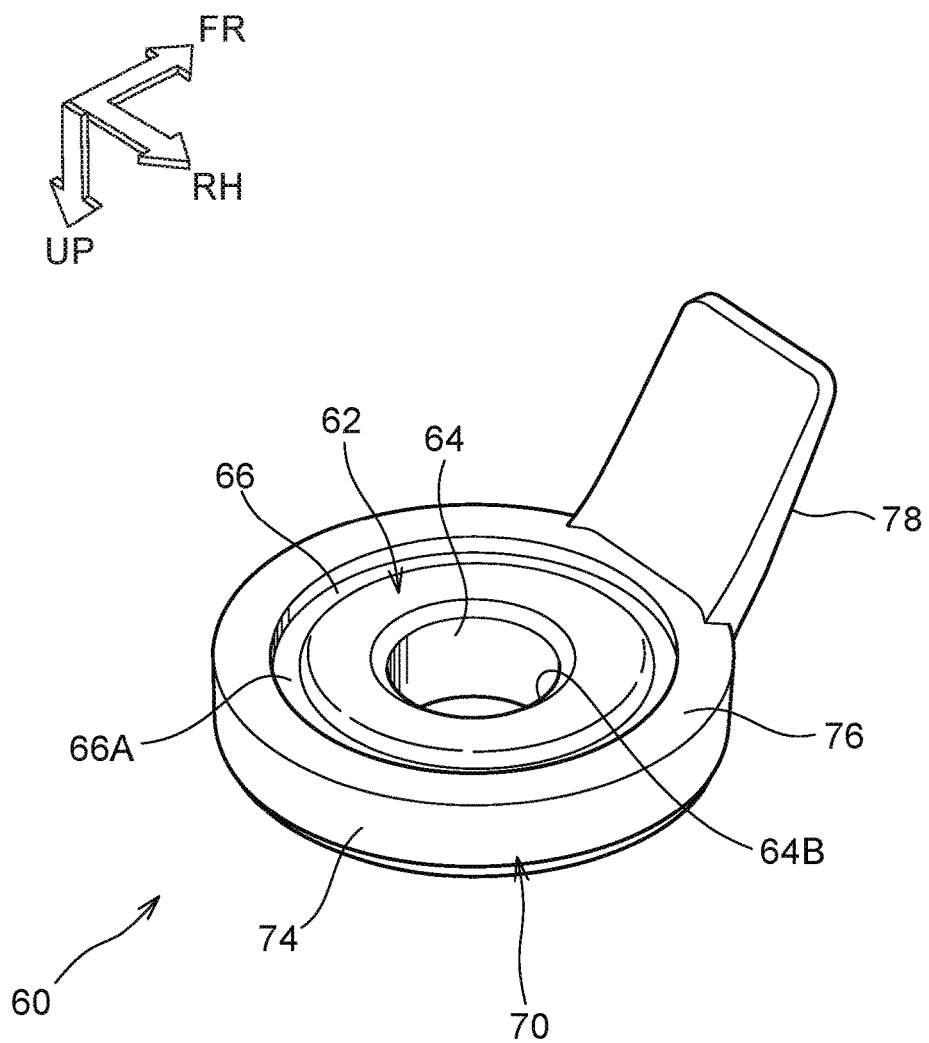
FIG. 5 is a perspective view in which the collar shown in FIG. 4 is seen from the vehicle lower side.

The molded portion 70 also includes a ring-shaped side wall 74 that projects to the lower side from an outer periphery portion of the base portion 72. The side wall 74 covers an outer periphery face of the collar flange 66. As shown in FIG. 1 and FIG. 5, the molded portion 70 further includes a ring-shaped lower wall 76 that projects toward the diametric direction inner side of the collar flange 66 from a lower end portion of the side wall 74. The lower wall 76 is disposed in the incision portion 66A and covers an outer periphery portion of an upper face of the incision portion 66A. A lower face of the lower wall 76 is disposed to be coplanar with the lower face of the collar main body 62.

A substantially plate-shaped handle portion 78 is integrally formed at the molded portion 70. The handle portion 78 projects to the lower side from the molded portion 70. More specifically, in a vertical sectional view of the collar 60, the handle portion 78 is disposed to be angled to the diametric direction outer side of the collar 60 toward the lower side, from a boundary portion between the side wall 74 and the lower wall 76. A plate thickness direction of the handle portion 78 is substantially in the diametric direction of the collar 60. Thus, a structure is formed such that a worker may grip the handle portion 78 and place the collar 60.

As shown in FIG. 4, the gap regulation portion 80 includes the base portion 72 of the above-described molded portion 70, a plural number (12 in the present exemplary embodiment) of pegs 82 formed at the base portion 72 that serve as "gap regulation protrusions", and a two-sided tape 84 that serves as a "retaining member" and an "adhesive member".

Each peg 82 is formed in a substantially circular rod shape and protrudes to the upper side (the side at which the outer panel 12 is disposed) from an inner periphery portion of the upper face of the base portion 72. The plural pegs 82 are formed into groups of three of the pegs 82. Each group of the pegs 82 is disposed to form a set at an edge of the disposition hole 72A; the pegs 82 are arranged along the circumferential direction of the disposition hole 72A. That is, each three pegs 82 are disposed to oppose one of the engaged faces 64A of the tubular portion 64 in a direction orthogonal to the engaged face 64A. A distal end portion (upper end portion) of each peg 82 is formed in a substantially hemispherical shape. The pegs 82 are structures that, in the fastened state of the fastening structure S, are crushed by the outer panel 12 and abut against the lower face of the outer panel 12 (see FIG. 1).

The two-sided tape 84 is formed in a ring shape with a thickness direction thereof in the vertical direction, and is disposed at the diametric direction outer side of the collar 60 relative to the pegs 82. More specifically, the two-sided tape 84 is disposed at an outer periphery portion of the upper face of the base portion 72 and is disposed to oppose the outer side ribs 44A and 44B of the above-described washer 40 in the vertical direction with the outer panel 12 therebetween. The upper face of the two-sided tape 84 is adhered to the lower face of the outer panel 12 and retains the collar 60 at the outer panel 12 (see FIG. 6A). In the fastened state of the fastening structure S, the two-sided tape 84 is pressed by the outer panel 12 so as to be in a state of being compressed in the vertical direction (see FIG. 1).

Now, operations and effects of the present exemplary embodiment are described while a procedure for fastening the rear spoiler 20 to the outer panel 12 with the fastening structure S is described.

Figure 6A:
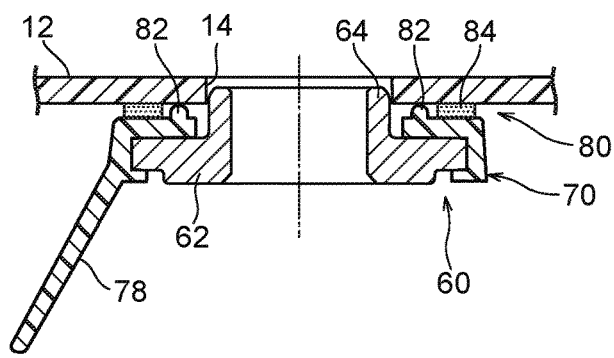
FIG. 6A is a sectional diagram in which the outer panel retains the collar shown in FIG. 1.

When the rear spoiler 20 is to be fastened to the outer panel 12 by the fastening structure S, first, as shown in FIG. 6A, the collar 60 is retained at the outer panel 12. More specifically, a worker grips the handle portion 78 of the collar 60, positions the tubular portion 64 of the collar 60 relative to the penetrating hole 14 of the outer panel 12, and inserts the tubular portion 64 into the penetrating hole 14 from the lower side thereof. At this time, the collar flange 66 and base portion 72 of the collar 60 are disposed at the lower side of the outer panel 12 and the upper face of the two-sided tape 84 adheres to the lower face of the outer panel 12. Thus, the base portion 72 (and thus the collar 60) is retained at the outer panel 12. Further at this time, distal ends of the pegs 82 are abutted against the lower face of the outer panel 12 in a state in which the pegs 82 of the collar 60 are not crushed, and the two-sided tape 84 is in a state of substantially not being compressed in the vertical direction. The upper face of the collar main body 62 (of the tubular portion 64) is disposed at the lower side relative to the upper face of the outer panel 12.

Meanwhile, the threaded portion 34 of the bolt 30 has been inserted into the washer 40, putting the bolt 30 and the washer 40 into an assembled state (see FIG. 3). The head portion main body 32A of the bolt 30 is inserted into the mounting slot 24D of the mounting portion 24 of the bolt 30 and the floor wall 24C of the mounting portion 24 is nipped by the flanged portion 32B of the bolt 30 and the washer 40. Thus, the floor wall 24C of the mounting portion 24 is in a state of being retained by the flanged portion 32B of the bolt 30 and the washer 40.

Figure 6B:
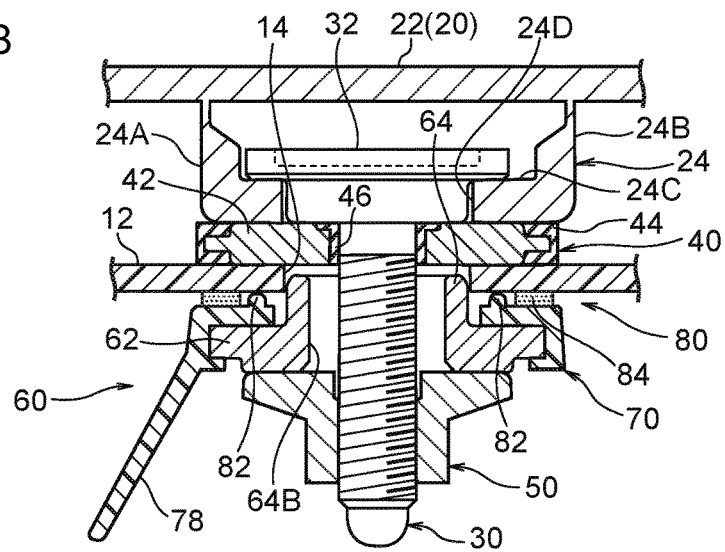
FIG. 6B is a sectional diagram of the outer panel, in which a rear spoiler is disposed on the outer panel and a nut is screwed onto a threaded portion of the bolt.

As shown in FIG. 6B, in the state in which the floor wall 24C of the mounting portion 24 is retained by the flanged portion 32B of the bolt 30 and the washer 40, the washer 40 is placed on the upper side of the outer panel 12. At this time, the threaded portion 34 of the bolt 30 is inserted inside the penetrating hole 64B of the collar main body 62 from the upper side thereof. Then, the nut 50 is screwed onto the threaded portion 34 from the distal end side (the lower end side) of the threaded portion 34, and the seat face of the nut 50 is abutted (seated) against the lower face of the collar main body 62. In this state, the upper face of the collar main body 62 (the tubular portion 64) is disposed at the lower side relative to the lower face of the washer main body 42.

Figure 6C:
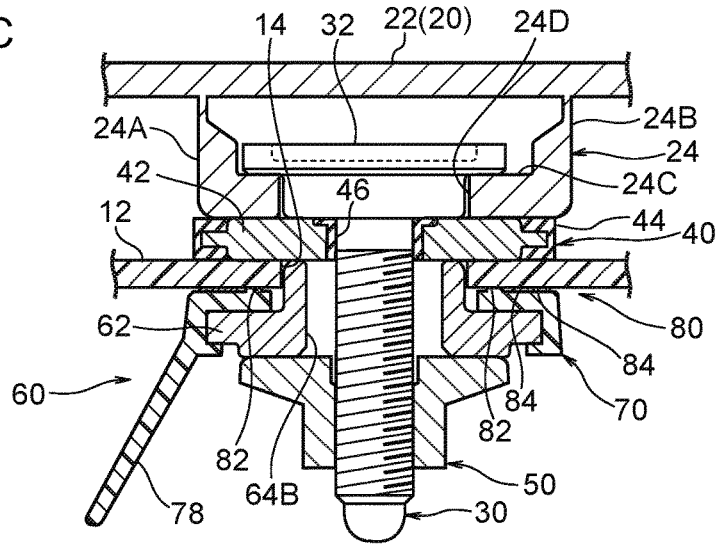
FIG. 6C is a sectional diagram of the outer panel in a completely fastened state of the fastening structure.

Then, when the nut 50 is turned from the state shown in FIG. 6B and moved toward the proximal end side of the threaded portion 34, as shown in FIG. 6C, the collar main body 62 is moved to the upper side together with the nut 50 and the upper face of the collar main body 62 (the tubular portion 64) is abutted against the lower face of the washer main body 42. Thus, the collar main body 62 is fastened by the washer main body 42 and the nut 50. At this time, the pegs 82 of the gap regulation portion 80 of the collar 60 are pressed by the outer panel 12 and crushed in the vertical direction, and the two-sided tape 84 is pressed by the outer panel 12 and compressed in the vertical direction. Thus, the collar 60 is fastened by the nut 50 and the bolt 30.

In a case in which the collar 60 is fastened by the nut 50 and the bolt 30, fastening force from the bolt 30 and the nut 50 also acts on the washer 40. Consequently, the outer side ribs 44A and 44B of the washer 40 are also pressed by the outer panel 12 and compressively deformed in the vertical direction. Meanwhile, the inner side rib 46A of the washer 40 is pressed by the head portion main body 32A of the bolt 30 and compressively deformed in the vertical direction.

According to the fastening structure of the present exemplary embodiment, the collar main body 62 fabricated of metal is provided between the washer main body 42 of the washer 40 and the nut 50, and the washer main body 42 and nut 50 that are each fabricated of metal touch against the collar main body 62. Therefore, the washer main body 42 may be put into metal-to-metal contact with the collar main body 62, and the nut 50 may be put into metal-to-metal contact with the collar main body 62. Thus, a fastening strength by the bolt 30 and the nut 50 may be assured. The collar main body 62 also includes the collar flange 66 that is disposed at the lower side of the outer panel 12.

The base portion 72 of the molded portion 70 that structures a portion of the collar 60 and is fabricated of resin is disposed between the collar flange 66 and the outer panel 12. Therefore, direct abutting against the outer panel 12 by the collar main body 62 (the collar flange 66) fabricated of metal may be suppressed. As a result, the occurrence of creep in the outer panel 12 may be suppressed.

The gap regulation portion 80 that structures a portion of the collar 60 includes the two-sided tape 84. After fastening by the fastening structure S is completed, the two-sided tape 84 is compressed between the base portion 72 of the molded portion 70 of the collar 60 and the outer panel 12. Therefore, both variations in plate thickness of the outer panel 12 may be absorbed by the two-sided tape 84 and looseness of the collar 60 with respect to the outer panel 12 may be suppressed.

At the gap regulation portion 80, the collar 60 is retained at the outer panel 12 by the two-sided tape 84. Therefore, the nut 50 may be screwed onto the threaded portion 34 of the bolt 30 in the state in which the collar 60 is retained at the outer panel 12. Thus, ease of working for a worker may be improved. Accordingly, both looseness of the collar 60 with respect to the outer panel 12 may be suppressed and ease of working may be improved.

Because the gap regulation portion 80 of the collar 60 is structured with the two-sided tape 84 as described above, the collar 60 may be retained at the outer panel 12 with a simple structure. Also as described above, after the completion of fastening by the fastening structure S, the two-sided tape 84 is compressed between the base portion 72 of the collar 60 and the outer panel 12. Therefore, sealing between the collar 60 and the outer panel 12 may be implemented by the two-sided tape 84.

The gap regulation portion 80 of the collar 60 is also structured with the pegs 82. The pegs 82 protrude to the upper side from the base portion 72 of the molded portion 70, and the pegs 82 abut against the outer panel 12. Consequently, the outer panel 12 may be nipped by the pegs 82 constituted of resin and the washer 40. Thus, both variations in plate thickness of the outer panel 12 may be absorbed by the pegs 82 and looseness of the collar 60 with respect to the outer panel 12 may be further suppressed.

The handle portion 78 is formed at the molded portion 70 of the collar 60. The handle portion 78 projects to the lower side from the collar 60. Therefore, as described above, the two-sided tape 84 of the collar 60 may be adhered to the lower face of the outer panel 12 while the tubular portion 64 of the collar main body 62 is disposed in the penetrating hole 14 of the outer panel 12 in the state in which a worker is gripping the handle portion 78. Thus, ease of working for the worker may be effectively improved.

The penetrating hole 14 of the outer panel 12 is formed in the rectangular shape and the inner periphery face of the penetrating hole 14 is structured by the four engaging faces 14A. Viewed in the axial direction of the collar 60, the exterior shape of the tubular portion 64 of the collar main body 62 is formed in the rectangular shape that is similar in shape to the penetrating hole 14, and the side faces of the tubular portion 64 are structured by the four engaged faces 64A. Therefore, if the collar 60 starts to turn about its own axis, the engaged faces 64A engage with the engaging faces 14A disposed at the outer sides of the engaged faces 64A, restricting turning of the collar 60. Thus, when the nut 50 is screwed onto the threaded portion 34 of the bolt 30, the engaged faces 64A may function as a detent for the collar 60, suppressing relative turning of the collar 60 with respect to the outer panel 12. Therefore, the nut 50 may be fastened to the collar 60 excellently.

Because the engaged faces 64A of the collar 60 engage with the engaging faces 14A of the penetrating hole 14 of the outer panel 12 and relative turning of the collar 60 with respect to the outer panel 12 is suppressed, turning of the bolt 30 about its own axis together with the collar 60 may also be suppressed. Therefore, when the nut 50 is being fastened to the bolt 30, a turning force from the nut 50 that acts on the mounting portion 24 may be reduced. To explain this in more specific terms, when the nut 50 is being fastened to the bolt 30, the nut 50 is screwed onto the threaded portion 34 of the bolt 30 and the seat face of the nut 50 is abutted (seated) against the lower face of the collar main body 62. Thus, the nut 50, the collar 60 and the bolt 30 are made integral. If the nut 50 is turned in this state, the collar 60 and the bolt 30 act to turn together with the nut 50. Consequently, one of the side faces 32B1 of the flanged portion 32B of the bolt 30 abuts against the side wall 24A at the front side of the mounting portion 24, causing a turning force of the nut 50 to act on the side wall 24A via the side face 32B1 of the bolt 30. As a result, a relatively high stress is produced at an upper end portion of the side wall 24A and there is a danger of the upper end portion of the side wall 24A breaking. However, in the present exemplary embodiment as described above, because the engaged faces 64A of the collar 60 engage with the engaging faces 14A of the penetrating hole 14 of the outer panel 12, relative turning of the collar 60 with respect to the outer panel 12 is suppressed. Consequently, turning of the collar 60 together with the nut 50 is suppressed. Therefore, the transmission of turning of the nut 50 through the collar 60 to the washer 40 and the bolt 30 may be suppressed and turning of the bolt 30 about its own axis may be suppressed. Thus, when the nut 50 is being fastened to the bolt 30, the turning force of the nut 50 that acts on the mounting portion 24 may be reduced. As a result, breakage of the upper end portion of the side wall 24A may be prevented.

The outer side ribs 44A and 44B protruding to the lower side are formed at the outer side rubber portion 44 of the washer 40 constituted of rubber. The outer side ribs 44A and 44B are pressed and compressed by the outer panel 12. Therefore, sealing between the washer 40 and the outer panel 12 may be implemented by the outer side ribs 44A and 44B. Consequently, ingression of liquids such as water and the like between the washer 40 and the outer panel 12 and into the penetrating hole 14 of the outer panel 12 may be prevented or suppressed, and ingression of particles such as dust and the like into the penetrating hole 14 may be prevented or suppressed.

The inner side rib 46A protruding to the upper side is formed at the inner side rubber portion 46 of the washer 40 constituted of rubber. The inner side rib 46A is pressed and compressed by the head portion main body 32A of the bolt 30. Therefore, sealing between the head portion 32 of the bolt 30 and the washer 40 may be implemented by the inner side rib 46A. Consequently ingression of liquids such as water and the like between the head portion 32 of the bolt 30 and the washer 40 and into the penetrating hole 14 of the outer panel 12 may be prevented or suppressed, and ingression of particles such as dust and the like into the penetrating hole 14 may be prevented or suppressed.

In the present exemplary embodiment, the gap regulation portion 80 of the collar 60 includes the two-sided tape 84 and the pegs 82 formed at the base portion 72 of the molded portion 70. However, the pegs 82 formed at the molded portion 70 may be omitted. That is, the gap regulation portion 80 may be structured by the two-sided tape 84 and the base portion 72 of the molded portion 70.

In the present exemplary embodiment, a structure is formed in which the collar 60 is retained at the outer panel 12 by the two-sided tape 84 of the gap regulation portion 80 of the collar 60. However, the two-sided tape 84 of the gap regulation portion 80 of the collar 60 may be replaced with an adhesive agent.

In the present exemplary embodiment, the pegs 82 of the gap regulation portion 80 of the collar 60 are formed in circular rod shapes and the distal end portions of the pegs 82 are formed in hemispherical shapes, but the shapes of the pegs 82 are not limited thus. For example, the pegs 82 may be formed in conical shapes and may be formed in pyramidal shapes.

In the present exemplary embodiment, the penetrating hole 14 of the outer panel 12 is formed in a rectangular shape and the exterior shape of the tubular portion 64 of the collar 60, seen in the axial direction, is formed in a rectangular shape that is a similar shape to the penetrating hole 14. However, the outer shapes of the penetrating hole 14 and the tubular portion 64 are not limited to this shape. For example, the penetrating hole 14 may be formed in a polygonal shape (a triangular shape, a pentagonal shape or the like), and the exterior shape of the tubular portion 64 may be formed in a polygonal shape that is a similar shape to the penetrating hole 14 as viewed in the axial direction. The shape of the penetrating hole 14 may further be formed in a "D" shape, a running track shape or the like, and the exterior shape of the penetrating hole 14 may be formed in a "D" shape, a running track shape or the like that is a similar shape to the penetrating hole 14 as viewed in the axial direction. That is, it is sufficient if at least one engaging face 14A is formed at the inner periphery face of the penetrating hole 14 and at least one engaged face 64A is formed at the outer periphery face of the tubular portion 64 to be engageable with the engaging face 14A. For example, the outer shapes of the penetrating hole 14 and the tubular portion 64 may be formed as circular shapes, a rib (a key) extending in the vertical direction (an element which may be broadly understood as serving as the "engaged portion") may be formed at an outer periphery portion of the tubular portion 64, and a recess portion (a key groove) into which the rib fits tightly (an element which may be broadly understood as serving as the "engaging portion") may be formed at the penetrating hole 14. In this structure, the rib and the recess portion engage in the circumferential direction of the tubular portion 64. Therefore, relative turning of the collar 60 with respect to the outer panel 12 may be restricted.

In the present exemplary embodiment, the outer side rubber portion 44 and inner side rubber portion 46 of the washer 40 are constituted of rubber, but resilient materials constituting the outer side rubber portion 44 and inner side rubber portion 46 of the washer 40 are not limited thus. For example, the outer side rubber portion 44 and inner side rubber portion 46 of the washer 40 may be constituted of an elastomer or the like.

Second Exemplary Embodiment

Herebelow, a fastening structure S according to a second exemplary embodiment is described using FIG. 7 to FIG. 9. In the first exemplary embodiment, the molded portion 70 of the collar 60 and the outer panel 12 are adhered with the two-sided tape 84. On the other hand, in the fastening structure S of the second exemplary embodiment, a welding rib 83 provided at the collar 60 and the outer panel 12 are welded through vibration and the collar 60 and the outer panel 12 are made integral.

Herein below, the difference points between the first exemplary embodiment and the second exemplary embodiment are mainly described. The same features as those in the first exemplary embodiment are denoted by the same reference signs as those of the first exemplary embodiment.

—Collar 60—

The collar 60 of the present exemplary embodiment includes a collar main body 62 fabricated of metal and the molded portion 70 fabricated of resin as shown in FIG. 7. The collar 60 includes a gap regulation portion 80. The gap regulation portion 80 reduces looseness of the collar 60 with respect to the outer panel 12 and makes the outer panel 12 retain the collar 12.

The collar 62 includes a tubular portion 64 in a tubular shape of which axial direction is in the vertical direction. This tubular portion 64 includes engaged faces 64A that are four planer side faces at an outer periphery portion and a penetrating hole 64B with a circular shape in cross section at an inner periphery portion. In a case in which the upper end portion of the tubular portion 64 penetrates into a penetrating hole 14, the engaged portions 64A of the tubular portion 64 engage with engaging faces 14A of the inserting hole 14 disposed at the outer side of the engaged faces 64A and the turning of the collar 60 is restricted.

Figure 8A:
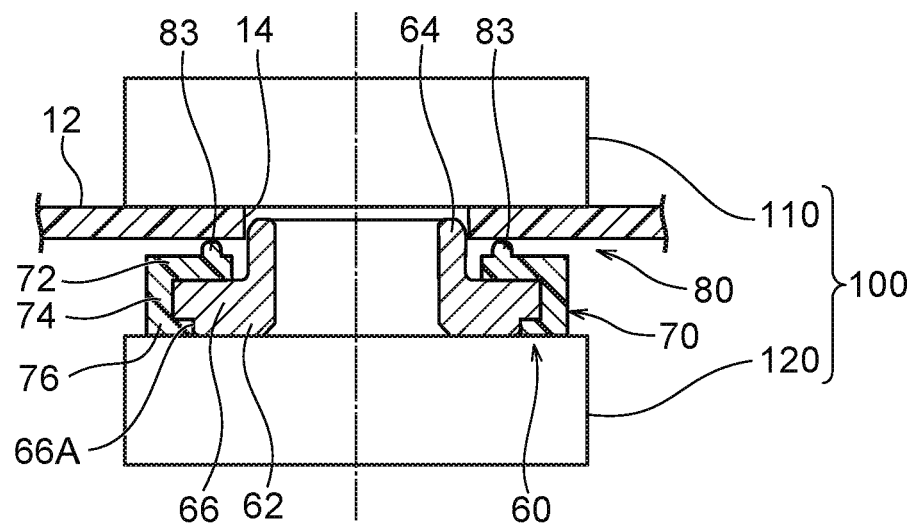
FIG. 8A is a sectional diagram of the collar and the outer panel shown in FIG. 7 before welding that are attached to the vibration welding device.
Figure 8B:
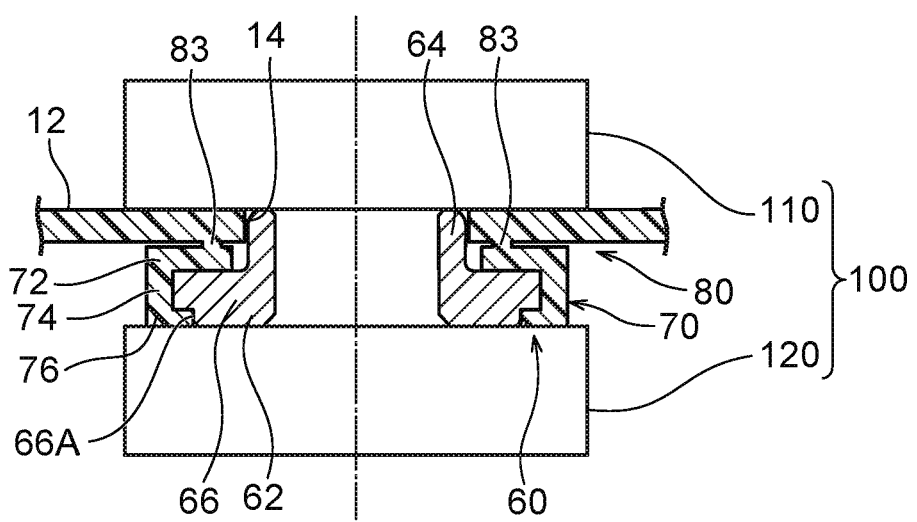
FIG. 8B is a sectional diagram of the collar and the outer panel shown in FIG. 7 after welding that are attached to the vibration welding device.

As shown in FIGS. 8A and 8B, the collar main body 62 includes a collar flange 66 that projects from the lower end portion of the tubular portion 64 and extends over the whole circumference in the circumferential direction of the tubular portion 64. The outer shape of the collar flange 66 is a circular shape viewed in the axial direction of the tubular portion 64. A lower face of the collar main body 62 includes a lower face of the collar flange 66 and a lower face of the tubular portion 64 that are disposed to be coplanar. An incision portion 66A is formed at the outer peripheral portion of the lower face of the collar flange 66. This incision portion 66A opens toward the lower side and the diametric direction outer side of the collar flange 66.

The molded portion 70 is formed integrally with the collar main body 62 so as to cover the collar flange 66. Specifically, as shown in FIGS. 8A and 8B, the molded portion 70 is formed in a substantial "U" shape that opens toward the diametric direction inner side of the collar main body 62 in a vertical sectional view. More specifically, the molded portion 70 includes a base portion 72 in a substantial circular plate integrally with the upper face of the collar flange 66. The base portion 72 is disposed between the collar flange 72 and the outer panel 12 (see FIG. 9C). As shown in FIG. 7, in the base portion 72, a disposition hole 72A is formed so as to vertically penetrate through the base portion 72 in order to dispose the tubular portion 64 of the collar main body 62. The disposition hole 72A is formed in a rectangle shape that is similar shape as the outer shape of the tubular portion 64. The upper face of the base portion 72 is disposed along a plane that is orthogonal to the axial direction of the tubular portion 64 and is disposed so as to oppose the lower face of the outer panel 12 in a vertical direction.

As shown in FIGS. 8A and 8B, the molded portion 70 includes a side wall 74 in a ring shape that extends toward the lower side from the outer peripheral portion of the base portion 72 and the side wall 74 covers the outer side peripheral face of the collar flange 66. The molded portion 70 includes a lower wall 76 in a ring shape that extends toward a diametric direction inner side of the collar flange 66 from a lower end portion of the side wall 74. The lower wall 76 is disposed at the inner portion of the incision portion 66A and covers the outer peripheral portion of the incision portion 66A. The lower face of the lower wall 76 and the lower face of the collar main body 62 are disposed to be coplanar.

As shown in FIG. 7, the gap regulation portion 80 includes the base portion 72 of the molded portion 70 and a plurality of (12 in the present exemplary embodiment) welding ribs 83 that are an example of "gap regulation protrusions" formed at the base portion 72. The welding ribs 83 as "gap regulation protrusions" of the present exemplary embodiment are also "retaining member" that makes the base portion 72 retain the outer panel 12.

The welding ribs 83 are respectively formed in a substantial circular rod shape and protrude from the inner peripheral portion at the upper face of the base potion 72 toward the upper side (toward the outer panel 12). One set of the welded ribs 83 includes three welded ribs 83 and each of the one set of the welded ribs 83 is disposed to form a pair with an edge of the disposition hole 72A and the welded ribs 83 are disposed along the circumferential direction of the disposition hole 72A. That is, in a direction orthogonal to the engaged face 64A of the tubular portion, three welding ribs 83 are disposed to oppose each of the engaged face 64A. The distal end portion (the upper end portion) of the welded rib 83 is formed in a substantial hemispherical shape. During the welding steps described below, the welded ribs 83 are welded to the outer panel 12 and the collar 60 integrally joins with the outer panel 12 (see FIG. 9B).

Now, the procedures to fasten a rear spoiler 30 to the outer panel with the fastening structure S are described below. The operations and effects of the present exemplary embodiment that are different from those of the first exemplary embodiment are described.

In the procedures to fasten, first, there is a welding step to weld the collar 60 to the outer panel 12.

By using FIGS. 8A and 8B, the welding step to weld the collar 60 to the outer panel 12 is described. The collar panel is welded to the outer panel 12 with a vibration welding device 100. The vibration welding device 100 includes a fixing jig 110, a vibration jig 120, and a vibration generator device.

FIG. 8A shows the collar 60 and the outer panel 12 before welding. Before welding, the worker attaches the fixing jig 110 so that the portion that surrounds the penetrating hole 14 and that is at the upper face of the outer panel 12 contacts with the lower face of the fixing jig 110. On the other hand, the worker attaches the vibration jig 120 to the collar 60 so that the welding rib 83 and the tubular portion 64 direct upward. While the worker holds the vibration jig 120 to which the collar 60 is attached and makes the position of the tubular portion 64 of the collar 60 fit with the penetrating hole 14 of the outer panel 12, the worker makes penetrate the penetrating hole 14 from the lower side toward the inner portion of the penetrating hole 14 of the tubular portion 64. At this moment, the welding rib 83 of the collar 60 contacts with the lower face of the outer panel 12.

In the status in which the vibration jig 120 is pushed toward the fixing jig 110, that is, in the status in which the welding rib 83 is pressed toward the outer panel 12, the vibration generator device is turned on. Thereby, the face of the welding rib 83 and the face of the outer panel 12 that are mutually pressed melt due to the friction heat. Because the welding rib 83 melts, as shown in FIG. 8B, the upper face of the collar main body 62 (the tubular portion 64) abut with the lower face of the fixing jig. That is, the upper face of the collar main body 62 (the tubular portion 64) and the upper face of the outer panel 12 mutually correspond.

FIG. 8B shows the collar 60 and the outer panel 12 after welding. In a case in which the vibration generator device is turned off in the status in which the upper face of the collar main body 62 (the tubular portion 64) abut with the lower face of the fixing jig 110, the melted portions in the face of the welding rib 83 and the face of the outer panel 12 that are mutually pressed are welded and the collar 60 and the outer panel 12 are mutually joined.

That is, the welding step is as follows.

Figure 9A:
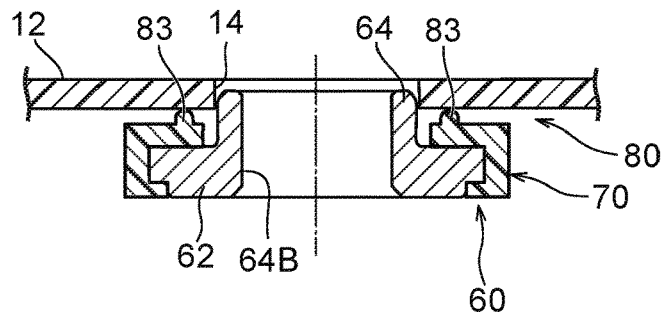
FIG. 9A is a sectional diagram of the outer panel shown in FIG. 7 that contacts with the collar.

As shown in FIG. 9A, the gap regulation portion 80 of the collar 60 includes the welding rib 83 and the welding rib 83 projects upward from the base portion 72 in the molded portion 70. In a case in which, while fitting the position of the tubular portion 64 of the color 60 with respect to the penetrating hole 14 of the outer panel 12 and makes the tubular portion 64 penetrate toward the inner portion of the penetrating portion 14, the welding rib 83 abut with the outer panel 12.

Figure 9B:
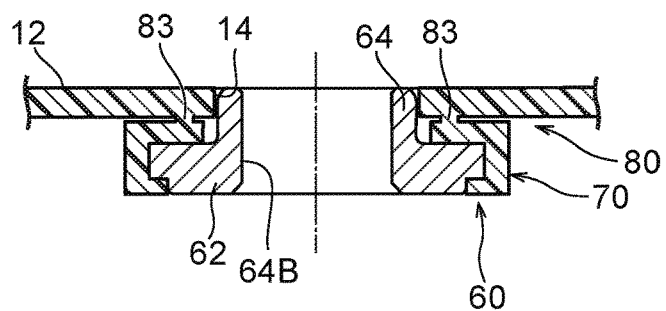
FIG. 9B is a sectional diagram of the outer panel that is integral with the collar by welding step.

After welding the molded portion 70 fabricated with resin (the welding rib 83) to the outer panel 12 with the vibration welding device 100, as shown in FIG. 9B, the collar 60 and the outer panel 12 are made integral. In the present exemplary embodiment, variations in plate thickness of the outer panel 12 may be absorbed by the welding rib 83 and the upper face of the collar main body 62 (the tubular portion 64) may be made correspond to the upper face of the outer panel 12.

A step to fasten a rear spoiler 20 to the collar 60 and the outer panel 12 that are made integral is described below.

First, by inserting a threaded portion 34 of a bolt 30 into the inner side of a washer 40, the bolt 30 and the washer 40 becomes an assembled state (see FIG. 3). At this moment, by inserting a head portion main body 32A of the bolt 30 into a mounting slot 24D of a mounting portion 24 of the bolt 30, a flanged portion 32B of the bolt 30 and the washer 40 nip a floor wall 24C of the mounting portion 24. Thereby, the floor wall 24C of the mounting portion 24 is held by the flanged portion 32B of the bolt 30 and the washer 40.

Figure 9C:
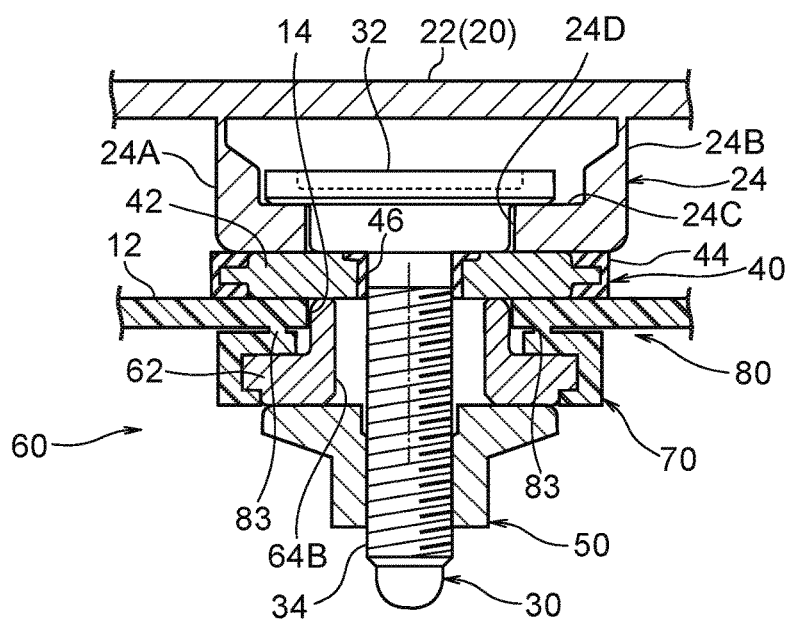
FIG. 9C is a sectional diagram of the outer panel in a completely fastened state of the fastening structure.

As shown in FIG. 9C, in the status in which the floor wall 24C of the mounting portion 24 is held by the flanged portion 32B of the bolt 30 and the washer 40, the washer 40 is disposed on the upper side of the outer panel 12. At this moment, the threaded portion 34 of the bolt 30 is inserted into the inner side of the penetrating hole 64B of the collar main body 62 from the upper side. The threaded portion 34 of the bolt 30 is screwed into a nut 50 from the distal end side (the lower end side) of the threaded portion 34 and a seat face of the nut 50 abuts (is seated) on the lower face of the collar main body 62.

As described above, the collar 50 and the outer panel 12 are made integral by joining and the upper face of the collar main body 62 (a tubular portion 64) corresponds to the upper face of the outer panel 12. Thereby, the nut 50 that is abutted (seated) on the lower face of the collar 62 is further turned, the collar main body 62 is fastened by the bolt 30 and the nut 50. Thus, the collar 60 is fastened by the bolt 30 and the nut 50.

In a case in which the collar 60 is fastened by the bolt 30 and the nut 50, the fastening force due to the bolt 30 and the nut 50 acts on the washer 40. Accordingly, the outer side ribs 44A and 44B (see FIG. 3) is pressed by the outer panel 12 and compressively deforms in vertical direction. The inner side rib 46A (see FIG. 3) also compressively deforms in vertical direction by pressing by the head portion main body 32A of the bolt 30.

The fastening structure of the present exemplary embodiment includes the same features as those of the first exemplary embodiment as follows. That is, the collar main body 62 fabricated of metal is disposed between the washer main body 42 of the washer 40 and the nut 50, the washer main body 42 fabricated of metal and the nut 50 respectively contact with the collar main body 62. Thereby, the washer main body 42 can be made metal-to-metal contact with the collar main body 62 and the nut 50 can be made metal-to-metal contact with the collar main body 62. Thus, the fastening force by the bolt 30 and the nut 50 can be assured. The collar main body 62 includes the collar flange 66 that is disposed at the lower side of the outer panel 12.

The base portion 72 of the molded portion 70 that is fabricated of resin and that is a part of the collar 60 is disposed between the collar flange 66 and the outer panel 12. Thereby, directly abutting the collar main body 62 (the collar flange 66) fabricated of metal on the outer panel can be suppressed. That is, the occurrence of creep at the outer panel 12 can be suppressed.

The fastening structure of the second exemplary embodiment further includes the following features in addition to the features of the first exemplary embodiment.

According to the present exemplary embodiment, in a case in which the rear spoiler 20 is fastened to the outer panel 12, the collar 60 is welded to the outer panel 12 in advance. Thereby, in a case in which there are variations in the plate thickness of the outer panel 12 and there are variations in the contact statuses of the plurality of the welding ribs 83 of the collar 60 to the outer panel 12, the variations can be absorbed by adjusting the welding margins of the welded rib 83.

In the present exemplary embodiment, the collar 60 and the outer panel 12 are made integral by the vibration welding. Accordingly, the two-sided tape as the retaining member is not necessary. In the first exemplary embodiment, assuming that the worker works with work gloves, the shape of the handle portion 78 is set so as to assure the holding margin. On the other hand, in the present exemplary embodiment, the worker can work by holding the vibration jig 120. Accordingly, in a case in which the collar 60 is adhered to the outer panel 12, the worker does not need to hold the handle portion 78. Thus, the handle portion 78 is not necessary.

In the present exemplary embodiment, the two-sided tape and the handle portion 78 are not necessary that are used in the first exemplary embodiment. Accordingly, the number of parts can be reduced and the manufacturing cost can be reduced.

In the present exemplary embodiment, the collar 60 and the outer panel 12 are joined by the vibration welding. Accordingly, the worker does not need remove release paper from the two-sided tape and the worker does not need to adhere the collar to the outer panel 12 while holding the collar 60. Thus, the labor of the worker can be saved and the manufacturing time can be reduced.

In the present exemplary embodiment, at the outer peripheral portion of the upper face of the base portion 72, the space for adhering the two-sided tape 84 is not necessary. That is, the outer diameter can be shorter than that of the first exemplary embodiment by the adhesive surface of the two-sided tape. By shortening the outer diameter of the collar 60, the fastening portions of the parts such as the spoiler and garnish can be moved to the nearest portions of the distal ends of these parts.

In the present exemplary embodiment, the welding rib 83 of the gap regulation portion 80 of the collar 60 is formed in a circular rod shape and the distal end portion of the welding rib 83 is formed in a hemispherical shape. However, the shape of the welding rib 83 is not limited to these shapes. For example, the welding rib 83 can be formed in a cone shape or in a pyramid shape.

The outer shapes of the penetrating hole 14 and the tubular portion 64 can be changed to the same shape as those of the first exemplary embodiment. Although the details are described above, the shape that can restrict the turning of the collar 60 with respect to the outer panel can be used in the present exemplary embodiment.

In the present exemplary embodiment, the resilient material that is used for the outer side rubber portion 44 and the inner rubber portion 46 of the washer 40 can be elastomer or the like instead of rubber as with the first exemplary embodiment.

A fastening structure according to a first aspect includes: an annular washer that is disposed adjacent to a plate-shaped resin member at one plate thickness direction side of the resin member and that includes a washer main body fabricated of metal; a bolt fabricated of metal, including a head portion that is disposed at the opposite side of the washer from the side thereof at which the resin member is disposed and that, together with the washer, sandwiches a fastened member, and a threaded portion that projects from the head portion to the other plate thickness direction side of the resin member and that penetrates through the inside of the washer and the inside of a penetrating hole formed in the resin member; a nut fabricated of metal that is screwed onto the threaded portion; a collar including a collar main body fabricated of metal that includes a tubular portion through which the threaded portion penetrates, and a flange that is formed at an outer periphery portion of the tubular portion and that is disposed at the other plate thickness direction side of the resin member, the collar main body touching against the washer main body and the nut; and a base portion fabricated of resin that structures a portion of the collar and that is disposed between the flange and the resin member.

In the fastening structure with the structure described above, the annular washer is adjacent to the one plate thickness direction side of the resin member, and the washer includes the washer main body fabricated of metal. The head portion of the bolt fabricated of metal is disposed at the opposite side of the washer from the side thereof at which the resin member is disposed. The fastened member is sandwiched by the head portion of the bolt and the washer. Thus, the fastened member is retained. The threaded portion of the bolt protrudes from the head portion of the bolt to the other plate thickness direction side of the resin member, and penetrates through the penetrating hole in the resin member and the interior of the washer. The nut is screwed onto the threaded portion.

The threaded portion of the bolt penetrates through the interior of the tubular portion of the collar main body that structures the collar and is fabricated of metal. The collar main body touches against the washer main body and the nut that are both fabricated of metal. That is, the collar main body is disposed between the washer main body and the nut and is in contact (metal-to-metal contact) with both. The collar main body includes the flange formed at the outer periphery portion of the tubular portion. The flange is disposed at the plate thickness direction other side of the resin member.

The base portion fabricated of resin that structures a portion of the collar is disposed between the flange and the resin member. Therefore, direct abutting of the collar main body (the flange) fabricated of metal against the resin member may be suppressed. As a result, the occurrence of creep in the resin member may be suppressed.

In a fastening structure according to a second aspect, the fastening structure of the first aspect includes a gap regulation portion that regulates a gap between the flange and the resin member, wherein the gap regulation portion includes the base portion, the base portion being structured integrally with the flange, and a retaining member that retains the base portion at the resin member.

In the fastening structure of the second aspect, the gap between the flange and the resin member is regulated by the gap regulation portion. Consequently, looseness of the collar with respect to the resin member may be suppressed.

The gap regulation portion includes the base portion that is formed integrally with the flange and the retaining member that retains the base portion at the resin member. Consequently, in a state in which the base portion (and thus the collar) is retained at the resin member by the retaining member, the nut may be screwed onto the threaded portion of the bolt. Thus, ease of working when the nut is to be screwed onto the threaded portion may be improved.

In a fastening structure according to a third aspect, in the fastening structure of the second aspect, the retaining member is provided at an opposing face of the base portion that opposes the resin member, and the retaining member is an adhesive member that is compressed between the base portion and the resin member.

In the fastening structure of the third aspect, the retaining member of the gap regulation portion is the adhesive member that is compressed between the resin member and the opposing face of the base portion that opposes the resin member. Consequently, the collar may be retained at the resin member by a simple structure and looseness between the collar and the resin member may be suppressed. In addition, sealing between the collar and the resin member may be implemented by the adhesive member.

In a fastening structure according to a fourth aspect, in the fastening structure of the second aspect or the third aspect, the gap regulation portion includes a regulation protrusion that protrudes from the base portion toward the resin member and abuts against the resin member.

In the fastening structure of the fourth aspect, the regulation protrusion of the gap regulation portion protrudes from the base portion toward the resin member and abuts against the resin member. Consequently, the resin member may be nipped by the washer and the regulation protrusion. Thus, variations in plate thickness of the resin member may be absorbed by the regulation protrusion and looseness of the collar with respect to the resin member may be further suppressed.

In a fastening structure according to a fifth aspect, in the fastening structure of any of the first to fourth aspects, the collar includes a handle portion that is formed integrally with the base portion and that projects from the collar to the other plate thickness direction side of the resin member.

In the fastening structure of the fifth aspect, the collar includes the handle portion that is formed integrally with the base portion. The handle portion projects from the collar to the other plate thickness direction side of the resin member. Consequently, the tubular portion of the collar may be disposed in the penetrating hole of the resin member in a state in which, for example, a worker is gripping the handle portion. Thus, ease of working for a worker may be effectively improved.

In a fastening structure according to a sixth aspect, in the fastening structure of any of the first to fifth aspects, the washer includes an outer side resilient portion that structures a diametric direction outer side portion of the washer and is constituted of a resilient material, and an outer side protrusion portion is formed at the outer side resilient portion, the outer side protrusion portion protruding toward the resin member and being compressed by the resin member.

In the fastening structure of the sixth aspect, because the outer side protrusion portion formed at the outer side resilient portion is compressed by the resin member, sealing between the washer and the resin member may be implemented by the outer side protrusion portion.

In a fastening structure according to a seventh aspect, in the fastening structure of any of the first to sixth aspects, the washer includes an inner side resilient portion that structures a diametric direction inner side portion of the washer and is constituted of a resilient material, and an inner side protrusion portion is formed at the inner side resilient portion, the inner side protrusion portion protruding toward the head portion of the bolt and being compressed by the head portion.

In the fastening structure of the seventh aspect, because the inner side protrusion portion formed at the inner side resilient portion is compressed by the head portion of the bolt, sealing between the washer and the bolt may be implemented by the inner side protrusion portion.

In a fastening structure according to an eighth aspect, in the fastening structure of the second aspects, the gap regulation portion protrudes toward the resin member from the base portion, and the resin member includes a gap regulation protrusion that is welded through vibration to the resin member.

In the fastening structure of the eighth aspect, the collar and the resin member are made integral by the vibration welding. Accordingly, the adhesive member is not necessary and the number of parts can be reduced. Further, the outer diameter of the collar can be shorter by the adhesive face of the adhesive member.

According to the fastening structure of the first aspect, the occurrence of creep in the resin member may be suppressed.

According to the fastening structure of the second aspect, looseness of the collar with respect to the resin member may be suppressed and ease of working may be improved.

According to the fastening structure of the third aspect, both the collar may be retained at the resin member with a simple structure and looseness between the collar and the resin member may be suppressed. In addition, sealing between the collar and the resin member may be implemented by the adhesive member.

According to the fastening structure of the fourth aspect, both variations in plate thickness of the resin member may be absorbed by the regulation protrusion and looseness of the collar with respect to the resin member may be further suppressed.

According to the fastening structure of the fifth aspect, ease of working may be effectively improved.

According to the fastening structure of the sixth aspect, sealing between the washer and the resin member may be implemented by the outer side protrusion portion.

According to the fastening structure of the seventh aspect, sealing between the washer and the bolt may be implemented by the inner side protrusion portion.

According to the fastening structure of the eighth aspect, the adhesive member is not necessary and the number of the parts can be reduced. Further, the outer diameter of the collar can be shorter by the adhesive face of the adhesive member.

What is claimed is:
1. A fastening structure comprising:
an annular washer that is disposed adjacent to a plate-shaped resin member at one plate thickness direction side of the resin member and that includes a washer main body fabricated of metal;

a bolt fabricated of metal, including:
   a head portion that is disposed at an opposite side of the washer from a side thereof at which the resin member is disposed and that, together with the washer, sandwiches a fastened member, and
   a threaded portion that projects from the head portion to another plate thickness direction side of the resin member and that penetrates through an inside of the washer and an inside of a penetrating hole formed in the resin member;

a nut fabricated of metal that is screwed onto the threaded portion;

a collar including a collar main body fabricated of metal that includes:
   a tubular portion through which the threaded portion penetrates,
   and
      a flange that is formed at an outer periphery portion of the tubular portion and that is disposed at the other plate thickness direction side of the resin member, the collar main body touching against the washer main body and the nut; and a base portion fabricated of resin that structures a portion of the collar and that is disposed between the flange and the resin member.

2. The fastening structure according to claim 1, further comprising a gap regulation portion that regulates a gap between the flange and the resin member, wherein the gap regulation portion includes:
   the base portion, the base portion being structured integrally with the flange, and
   a retaining member that retains the base portion at the resin member.

3. The fastening structure according to claim 2, wherein:
   the retaining member is provided at an opposing face of the base portion that opposes the resin member, and
   the retaining member is an adhesive member that is compressed between the base portion and the resin member.

4. The fastening structure according to claim 2, wherein the gap regulation portion includes a regulation protrusion that protrudes from the base portion toward the resin member and abuts against the resin member.

5. The fastening structure according to claim 2, wherein the gap regulation portion protrudes toward the resin member from the base portion, and the resin member includes a gap regulation protrusion that is welded through vibration to the resin member.

6. The fastening structure according to claim 1, wherein the collar includes a handle portion that is formed integrally with the base portion and that projects from the collar to the other plate thickness direction side of the resin member.

7. The fastening structure according to claim 1, wherein:
   the washer includes an outer side resilient portion that structures a diametric direction outer side portion of the washer and is constituted of a resilient material, and
   an outer side protrusion portion is formed at the outer side resilient portion, the outer side protrusion portion protruding toward the resin member and being compressed by the resin member.

8. The fastening structure according to claim 1, wherein:
   the washer includes an inner side resilient portion that structures a diametric direction inner side portion of the washer and is constituted of a resilient material, and
   an inner side protrusion portion is formed at the inner side resilient portion, the inner side protrusion portion protruding toward the head portion of the bolt and being compressed by the head portion.

* * * * *